United States Patent [19]

DeWitt

[11] 4,124,679
[45] Nov. 7, 1978

[54] METHOD OF BUILDING A TIRE WITH UNEQUAL BEAD DIAMETERS

[75] Inventor: Marion A. DeWitt, North Canton, Ohio

[73] Assignee: The Goodyear Tire & Rubber Company, Akron, Ohio

[21] Appl. No.: 473,647

[22] Filed: May 28, 1974

[51] Int. Cl.$^2$ .......................................... B29H 5/02
[52] U.S. Cl. .............................. 264/326; 152/352 R; 152/DIG. 6; 264/315
[58] Field of Search .................. 264/89, 94, 100, 315, 264/326; 152/330 R, 353 C, 352 R, DIG. 6

[56] References Cited

U.S. PATENT DOCUMENTS 3,765,468  10/1973  Verdier .............................. 152/352

Primary Examiner—Jan H. Silbaugh
Attorney, Agent, or Firm—Frank Pincelli

[57] ABSTRACT

A method of building an unequal bead diameter tire with conventional components and contour lengths which are substantially equal, the contour lengths being measured along the neutral axis of the carcass plies between the beads and a plane containing the mid-circumferential centerline of the tread. The tire is molded in a special configuration not usually employed in shaping a tire, i.e. the tread is unsymmetrical in relation to a plane which normally bisects the tread, and the lateral edges of the tread are radially offset and not equally spaced from the center axis of the mold which is normally the case when the conventional methods are used for molding and vulcanizing a tire.

6 Claims, 3 Drawing Figures

METHOD OF BUILDING A TIRE WITH UNEQUAL BEAD DIAMETERS

BACKGROUND OF THE INVENTION

The invention relates to tires having unequal bead diameters as shown and described in, for example, U.S. Pat. Nos. 2,018,597; 2,108,329, and British Pat. No. 1,275,409, and especially tires with unequal bead diameters and equal contour lengths where roughly one-half the width of the tread plus one sidewall is equal in length to one-half the width of the tread plus the other sidewall. The invention is directed to providing an improved method of molding a tire of this type.

Briefly stated, the invention is in a method of building a tire comprising a pair of annular beads with unequal bead diameters, and contour lengths which are substantially equal, the contour lengths of the sidewalls of the tire being measured along the neutral axis of the carcass plies between the center axis of the beads and a plane CP containing the mid-circumferential centerline of the tread, such plane hereinafter referred to as the centerplane. The tread is unsymmetrically molded in relation to a plane bisecting the space between the annular beads of unequal diameters, and the lateral edges of the tread are molded in radially offset relation to the center axis of the mold, or beads.

DESCRIPTION OF THE DRAWING

The following description of the invention will be better understood by having reference to the drawing, wherein.

ENVIRONMENT OF THE INVENTION

Figure 1:
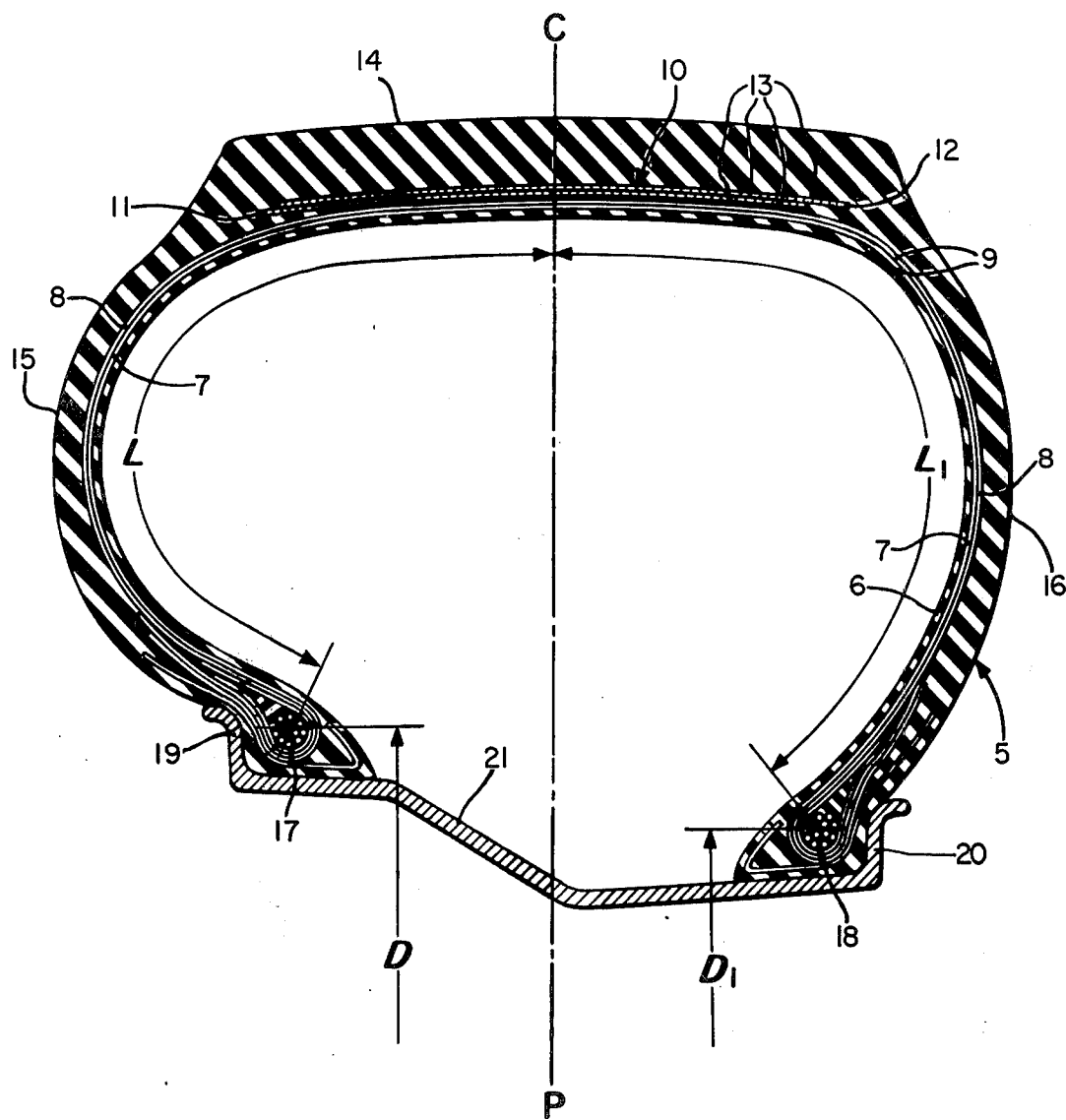
FIG. 1 is a section of a tire which is made in accordance with the invention and illustrated in an inflated condition on a rim, also shown in section.

Referring generally to the drawing and more particularly to FIG. 1, there is shown a tire 5 comprising the essential components of: a fluid impervious innerliner 6; a plurality of carcass plies 7 and 8, each of which include parallel reinforcement cords 9; a belt structure 10, including a pair of superimposed belts 11 and 12, each of which have parallel reinforcement cords 13; and a tread 14 and pair of sidewalls 15 and 16 surrounding the carcass plies 7, 8 and terminating at a pair of inner and outer annular beads 17 and 18 which are designed for seating engagement against adjacent outstanding flanges 19 and 20 of a wheel rim 21 on which the tire 5 is mounted.

The tire 5 is preferably a radial-type tire where the reinforcement cords 9 of the carcass plies 7 and 8 are radially oriented, i.e. disposed at angles in the range of from 75° to 90° measured from the centerplane. The invention may be utilized in bias and bias-belted type tires where the same carcass reinforcement cords 9 are disposed at angles in the range of from 28° to 48° measured relative to the centerplane. The reinforcement cords 13 of the belt structure 10 of a radial tire are disposed at angles in the range of from 0° to 30°, whereas the same belt cords 13 of a bias-belted tire are disposed at angles in the same range as the reinforcement cords 9 of the carcass plies 7 and 8, except that the angular disposition of the belt cords 13 is usually at least 1°–2° lower than correspondingly measured cord angles of the carcass plies.

The annular beads 17 and 18 of the tire 5 have unequal diameters D and $D_1$. The diameter D of each inner bead 17, in this instance, is greater than the correspondingly measured diameter $D_1$ of each outer bead 18 to provide greater space for larger braking mechanisms, since the terms "inner" and "outer" are in reference to the location of the beads 17 and 18 relative to an automobile on which the tire 5 is mounted, the inner beads 17 being closest the tire on the opposite side of the same automobile axle, and the outer beads 18 facing outwardly from the automobile. In other instances, it may be more desirable that the outer beads 18 have larger diameters, especially to change the esthetic appearance of the tire. From the standpoint of the handling and wear characteristics of a passenger tire, best results are achieved by not varying the diameters D and $D_1$ of the inner and outer beads 17 and 18 more than 2 inches. It is theorized, however, that the bead diameters D and $D_1$ of larger truck tires could vary by more than this amount, e.g. 3 inches.

The contour lengths L and $L_1$ of the sidewalls 15 and 16 are substantially equal. The contour lengths L and $L_1$ are measured along the neutral axis of the carcass plies 7 and 8 between the center axis of the beads 17 and 18, as shown, and the centerplane of the tire 5. The "neutral axis" is an axis midway between the total number of carcass plies which, in this case, is midway between the two carcass plies 7 and 8. In the case of a single ply tire, the neutral axis would bisect the single ply.

The mold in which the tire 5 is shaped, is designed to produce identical contour lengths L and $L_1$. However, these lengths may vary slightly due to an uneven gauge of rubber around the tire and because of minor inaccuracies in building and molding a tire. The contour lengths L and $L_1$ should, preferably, not vary by more than 1½ percent from the designed contour lengths, and tires 5 have been produced with contour lengths that do not vary by more than 0.1 inches. It should be appreciated that lengths correlated to the contour lengths can be measured along the outer surfaces of the tire 5, providing there are equal amounts of tire building material on both sides of the centerplane and outside the neutral axis, so long as the measurements are made between the centerplane of the tire and identical points in the areas of the inner and outer beads 17 and 18. It is desirable that the centerplane of the tire 5 coincide with the centerplane of the wheel rim 21 when the tire 5 is mounted on the wheel rim 21 and inflated. Any measurements of the contour lengths L and $L_1$ are made when the tire 5 is mounted on a wheel rim 21 and inflated to a normal inflation pressure, as recommended by the manufacturer of the tire.

Figure 2:
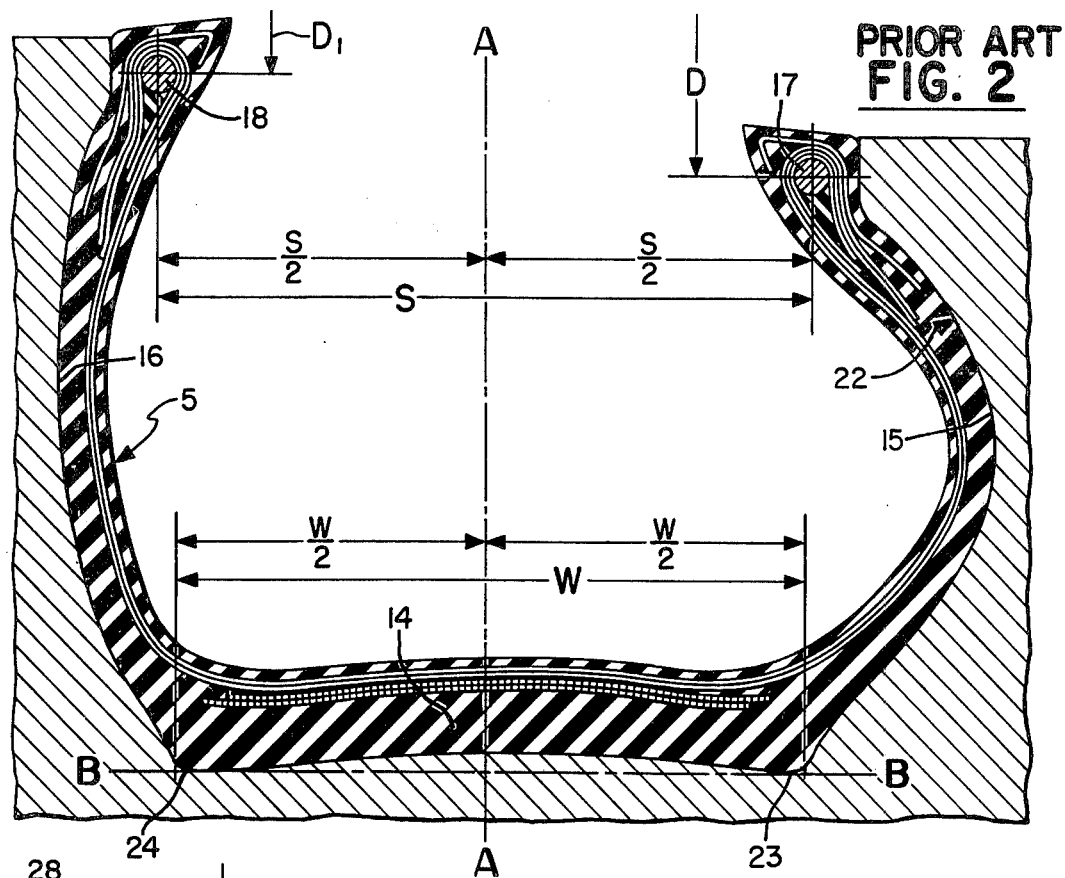
FIG. 2 is a section of the tire in a conventionally designed mold.

Referring to FIG. 2, there is shown a mold 22 which was conventionally designed for forming the tire 5 with unequal bead diameters D and $D_1$ and equal contour lengths L and $L_1$. The mold 22 has a centerplane A—A which bisects both the spacing S between the inner and outer beads 17 and 18 and the width W of the tread 14 of the tire 5 in the mold 22. The lateral edges, or inner and outer shoulders 23 and 24, respectively, of the tread 14 are equidistant from the plane A—A and lie in the same cylindrical surface B—B which is normal to the centerplane A—A. The ride and wear characteristics of tires produced in the mold 22 were found to be unfavorable. It was discovered that the molded and vulcanized tire 5 literally changed shape from the configuration anticipated; namely, the tread 14 shifted from the desired position shown in FIG. 2. It was found that the tread 14, upon inflation of the tire 5, moved laterally in the direction of the sidewall 16 extending from the outer bead 18 with the smaller diameter $D_1$. Moreover, the inner shoulder 23 of the tread 14 moved radially outwardly from the center axis of the tire 5, resulting in uneven wear of the shoulders 23 and 24 during operation of the tire 5. This change in shape of the tire 5 was counteracted by molding the tire 5 in a specially configured mold 25, as seen in FIG. 3.

THE INVENTION

Figure 3:
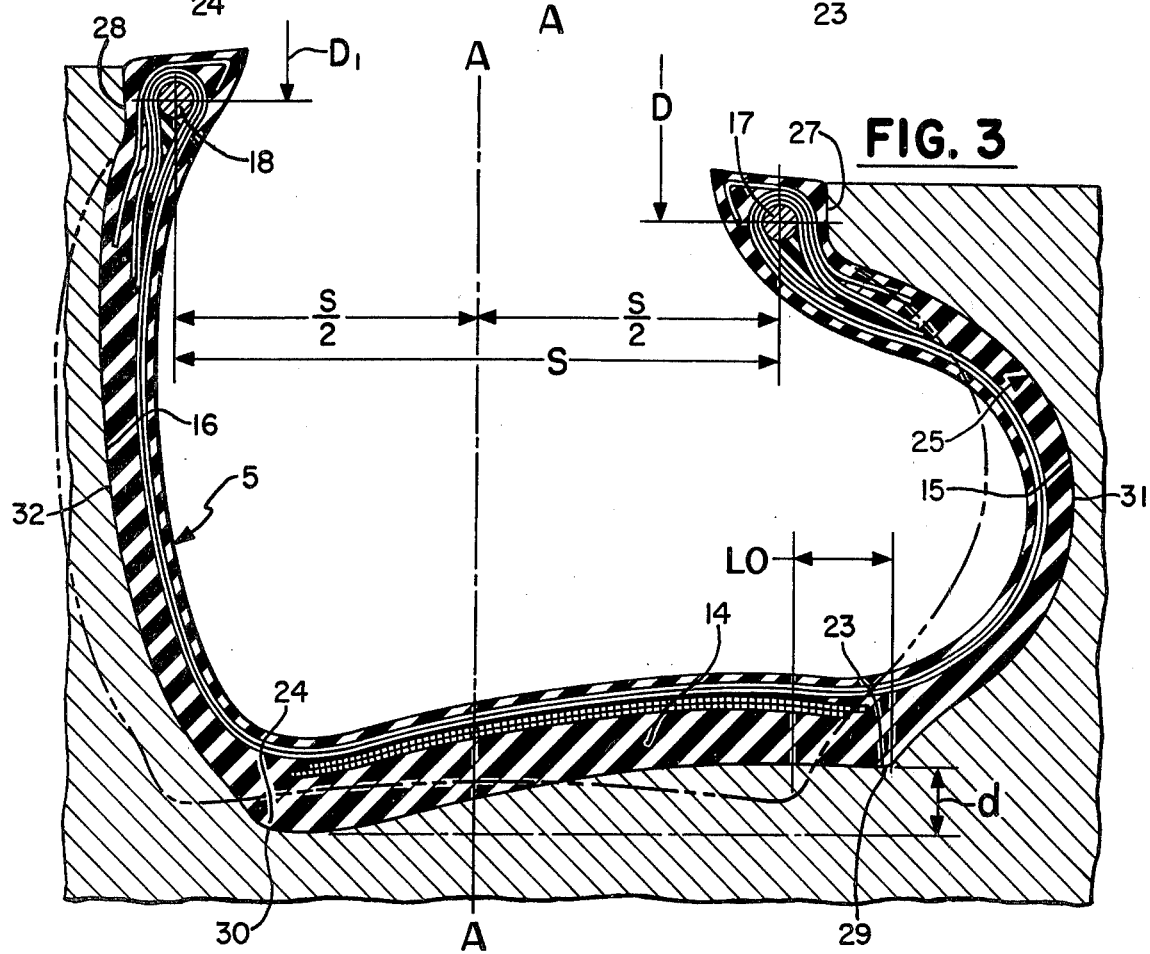
FIG. 3 is a section of the tire in the specially configured mold in which the tire is molded and vulcanized.

The configuration of the conventionally designed mold 22 (FIG. 2) is shown in dotted line in FIG. 3 for visual comparison with the specially designed mold 25. It can be observed that the annular mold contour 26 for forming the adjacent outer peripheral surface of the tread 14, is unsymmetrical in relation to the plane A—A bisecting the space S between the inner and outer tire beads 17 and 18 and opposing mold contours 27 and 28 adjacent the beads. The tread 14 and annular mold contour 26, in this instance, is laterally offset LO from the plane A—A about 1¼ inches which is in the preferred range of from 1 to 2 inches. Moreover, the inner and outer shoulders 23 and 24 of the tread 14, and the lateral edges 29 and 30 of the annular mold contour 26, are radially displaced, or offset a distance $d$ which is preferably in the range of from ½ to 1 inches.

In actual practice, the inner and outer shoulders 23 and 24 are radially displaced equal distances in opposite directions from the cylindrical surface B—B represented in FIG. 2. For example, the inner shoulder 23 is offset ⅜ inches toward the center axis of the tire 5 and the outer shoulder 24 is offset the same distance in an opposite direction from the center axis of the tire 5, thereby producing a radial displacement between the shoulders 23, 24 of ¼ inches.

The configurations of the sidewalls 15 and 16 are not critical in either of the molds 22 or 25 and generally follow suitably curved mold contours 31 and 32 between the fixedly positioned beads 17 and 18 and tread 14 sufficient to accommodate desired contour lengths L and $L_1$. An unequal bead diameter tire 5 produced in the specially configured mold 25, has a generally cylindrical tread 14 when the tire 5 is mounted on a rim and inflated; i.e. the tread 14 is slightly concave relative to the center axis of the tire 5, such concavity being normal for most tires having substantially flat treads. The lateral shifting of the tread 14 relative to the plane A—A, previously experienced with tires produced in the conventionally designed mold 22, was eliminated, or substantially reduced to a level where the handling and wear characteristics of the tire were not adversely affected.

Thus, there has been provided a method of accurately building a tire with unequal bead diameters and equal contour lengths, such tires being different from those shown in the aforementioned patents as having different contour lengths. A passenger tire with an inner bead diameter of 17 inches and an outer bead diameter of 15 inches was constructed, tested, and found to have good lateral stability, especially when cornering, i.e. rounding a corner. The spring characteristics of the tire were also found to be excellent, such that there was no apparent loss in riding comfort.

What is claimed is:

1. A method of molding and vulcanizing a tire with unequal bead diameters and equal contour lengths, comprising:
    (a) moving the beads adjacent opposing mold contours where the beads are spaced different distances from the center axis of the mold and equally spaced from a mold plane which is normal to the center axis of the mold;
    (b) expanding unvulcanized rubbery material of the tire against an annular mold contour in radially spaced relation from the opposing mold contours, to form an outer peripheral tread surface which, in the mold, is angularly disposed to the mold plane and unsymmetrical in relation thereto;
    (c) expanding other unvulcanized rubbery material of the tire against opposing, curved mold contours between the annular mold contour forming the tread surface and each of the mold contours adjacent the beads, for forming outer surfaces of the sidewalls of the tire; and
    (d) heating the unvulcanized rubbery material expanded against the mold contours, to vulcanize said material, thereby forming a tire.

2. The method of claim 1, wherein the annular mold contour has a pair of opposing annular, lateral edges which are radially displaced a distance of from ½ to 1 inch.

3. The method of claim 2, wherein the annular mold contour is curved between the opposing annular lateral edges thereof.

4. The method of claim 2, wherein the annular mold contour is laterally offset from 1 to 2 inches from the mold plane.

5. The method of claim 4, wherein reinforcement cords of at least one carcass ply are disposed at angles in the range of from 75° to 90° measured from the centerplane when the tire is molded, mounted on a rim, and inflated, to a pressure recommended by the tire manufacturer.

6. The method of claim 5, which includes embedding at least one pair of annular belt plies between the tread and closest carcass ply, said belt plies having reinforcement cords, disposed at angles in the range of from 10° to 30° measured from the centerplane when the tire is vulcanized, mounted on a rim, and inflated to a pressure recommended by the tire manufacturer.

* * * * *

UNITED STATES PATENT AND TRADEMARK OFFICE
CERTIFICATE OF CORRECTION

PATENT NO. : 4,124,679
DATED : Nov. 7, 1978
INVENTOR(S) : Marion A. DeWitt

It is certified that error appears in the above-identified patent and that said Letters Patent are hereby corrected as shown below:

column 3, line 39: "1/4 inches" should read -- 3/4 inches -- .

Signed and Sealed this

Thirteenth Day of October 1981

[SEAL]

Attest:

GERALD J. MOSSINGHOFF

Attesting Officer        Commissioner of Patents and Trademarks